(12) United States Patent
Albrecht et al.

(10) Patent No.: US 7,040,341 B2
(45) Date of Patent: May 9, 2006

(54) GAS PLUG CONNECTOR

(75) Inventors: Günter Albrecht, Weddersleben (DE); Thomas Vogt, Bad Suderode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 405 days.

(21) Appl. No.: 10/450,282

(22) PCT Filed: Oct. 1, 2002

(86) PCT No.: PCT/EP02/10997

§ 371 (c)(1),
(2), (4) Date: Jun. 11, 2003

(87) PCT Pub. No.: WO03/036154

PCT Pub. Date: May 1, 2003

(65) Prior Publication Data
US 2005/0016590 A1    Jan. 27, 2005

(30) Foreign Application Priority Data
Oct. 22, 2001    (DE) ............................... 101 51 995

(51) Int. Cl.
*F16K 43/00*    (2006.01)
(52) U.S. Cl. .................. 137/360; 137/329.3; 137/329.4
(58) Field of Classification Search ................ 137/360, 137/329.3, 329.4
See application file for complete search history.

(56) References Cited

U.S. PATENT DOCUMENTS

| | | | | |
|---|---|---|---|---|
| 3,563,267 A | * | 2/1971 | Thompson | 137/329.1 |
| RE28,334 E | * | 2/1975 | Cranage | 137/360 |
| 4,344,455 A | * | 8/1982 | Norton et al. | 137/329.4 |
| 4,683,905 A | * | 8/1987 | Vigneau et al. | 137/329.1 |

FOREIGN PATENT DOCUMENTS

| | | |
|---|---|---|
| DE | 253698 | 11/1912 |
| DE | 1136294 | 9/1962 |
| DE | 3519933 | 12/1986 |
| DE | 9112208.2 | 1/1992 |
| DE | 10061653 | 1/2002 |
| NO | 378829 | 8/1964 |

* cited by examiner

*Primary Examiner*—A. Michael Chambers
(74) *Attorney, Agent, or Firm*—Howard & Howard

(57) ABSTRACT

It shall be created a gas plug connector that allows a positional adjustment of the same in relation to the outer wall surface and in this way enables compensation of positional setoffs as regards the stationary gas pipe installation. To achieve this, the gas plug connector comprises a casing (1), a shut-off device (2) and a fastening element (3). The tube-shaped nozzle (12) of the shut-off device (2) protrudes in a gas-tight manner into the casing (1) which has in its interior a groove (8) inside which rests a spring holding ring (10). Said holding ring (10) allows the nozzle (12) to slip into the casing (1), but prevents the nozzle (12) from slipping out of the casing (1). The fastening element (3) is on its one side attached to the wall (31) and on its other side to the shut-off device (2).

8 Claims, 5 Drawing Sheets

GAS PLUG CONNECTOR

TECHNICAL FIELD

Figure 1:
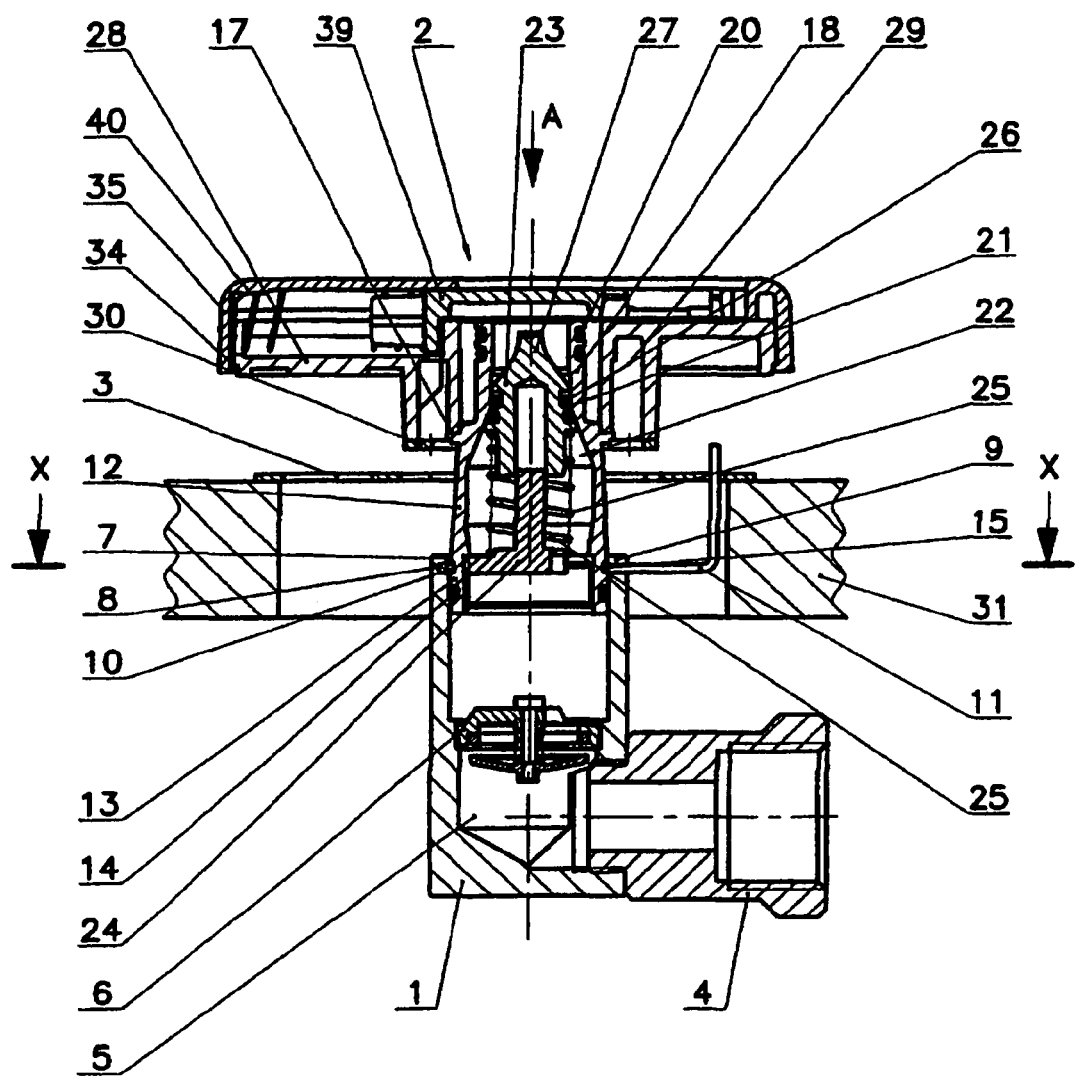

The invention relates to a gas plug connector in a casing that has an inlet socket to allow the connector to get permanently connected to a stationary gas pipe on or in a wall, and a shut-off device for the connection of a gas connector plug, in particular a gas hose plug. Said shut-off device opens the internal gas way after connecting the gas connector plug only if and when external tightness has been established.

PRIOR ART

Gas plug connectors serve to facilitate the connection between gas pipes fixed inside buildings and a gas-operated appliance, such as a kitchen range or a drier. Using such connectors allows any gas consumer to get connected to the gas pipe by simple means.

Gas plug connectors of the above mentioned kind are well known. DE 11 36 294, for example describes a so-called gas connector cock in which connection is made by inserting an appropriate gas hose connector into the connector bore at the tap cock that comprises a cock casing which houses a moveable plug. When turning the gas hose connector the gas connector cock at the same time is put in on, or off position. The cock casing as such is connected to the stationary gas pipe by means of a connecting thread.

Another type of gas plug connector, that also has proved to be reliable in practice, is described in DE 35 19 933 A1. Here, the gas plug connector is equipped with tube-shaped gas forward body, that can be adjusted by turning inside the casing, to take up a gas connector plug, and an intake port that is arranged at a right angle to the gas forward body. The shut-off device comprises a ball that can turn on the gas forward body's longitudinal axis, and an rectangular port inside that ball. The gas forward body's intake end, which is coupled to the ball to rotate in the same way, protrudes into the ball port's outlet end. The ball's surface rests on two elastic sealing rings that are located diametrical on the casing's walls, seen in longitudinal direction of the intake port. One of theses sealing rings is attached at a tube socket that is inserted in the intake port and serves to press the sealing ring against the ball.

The solution described in DE 91 12 208 U1 is a gas plug connector the design of which is the same as already described, in particular in DE 35 19 933 A1, but is specifically designed for use in concealed installations. For this purpose, the casing has a threaded intake socket for a screw connection with coupling ring and can be installed in, and removed from a box designed for flush mounting. The opening to house the gas connector plug is provided in the removable front cover of the box. Also, a nozzle is provided in one of the side walls of the box. The nozzle's end protruding outside the box can be connected to the gas pipe whereat the nozzle's end inside the box is equipped with the coupling ring that can be connected to the intake socket.

Another gas plug connector is described in DE 100 61 653 C1. That gas plug connector comprises a base body with integrated inlet socket to allow the connector to get permanently connected to a stationary gas pipe, an outlet socket screwed into the base body, and a base plate that surrounds the outlet socket's shell outer surface in a defined distance to take up the gas connector plug, an for the rest is screwed down to the base body. The base plate also serves as a shoulder towards the wall to which it is attached as well. On the base plate there is fixed in place a bonnet that has a cover which closes the connector opening when the gas connector plug is detached, and where said cover is equipped wit a latching device. The latching device is brought into a state ready for unlatching by a first attempt to insert the gas connector plug, to which the cover's latching device is adjusted, into an uptake opening. At least one additional move of the gas connector plug is needed to make the connector opening of the outlet socket accessible for the gas connector plug to be connected.

All these devices have in common the disadvantage that the position of the bore hole for the connection of the gas hose plug depends on the gas pipe's orientation as to the outer surface of the wall on or in which the pipe is installed. To have the gas plug connector installed in an esthetical way both outer wall surface and stationary gas pipe must have the same position, which means an expensive gas pipe installation.

Another disadvantage, in particular in surface installations, is that completed installation also includes the visible part of the gas plug connector. As a consequence, the gas plug connector runs the risk of being damaged, e.g. getting scratched during the work necessary in a room to finish it, which would impair the gas plug connector's decorative appearance.

In addition, most of the gas plug connector have the disadvantage that they do not allow replacement or readjustment of the gas plug connector's visible part(s) at a later time as it may become necessary after renovation or rehabilitation work.

DESCRIPTION OF THE INVENTION

The invention is based on the problem of developing a gas plug connector of the mentioned kind that allows an adjustment of the gas plug connector's position as to the wall's outer surface and, therefore, a compensation of positional deviations of the stationary gas pipe. In addition, final installation of the gas plug connector's external visible part shall be possible after completion of other work, for example when decorating a room. Also, replacement of the gas plug connector's external visible part(s) shall be possible without great effort.

According to the present invention, the problem is solved by providing the gas plug connector with a casing, a shut-off device and a fastening element. The casing is equipped with an inlet socket to allow a gas plug connector getting permanently connected to a stationary gas pipe installed in or on a wall. The shut-off device serves to connect a gas connector plug, in particular a gas hose plug, whereby said shut-off device opens the internal gas way only if and when external tightness has been established. A tube-shaped nozzle, that has a collar on its side facing towards the casing, and where such collar is bordering to a catch groove situated on its side pointing away from the casing, is in a gas tight-way projecting as part of the shut-off device into the casing which has in its interior a groove housing a spring holding ring with offset ends projecting through an opening in the casing around the groove into the exterior space. In open state, the holding ring's circular part is entirely resting inside the groove to allow the nozzle to slip into the casing, whereat the nozzle is prevented from slipping out of the casing by the catch ring resting in the groove. The fastening element is attached to the wall, and with its other end to the shut-off device, whereby the latter can swing around the nozzle's longitudinal axis, seen from the casing, after its other end has been detached. Only after one additional actuation of the holding ring's offset ends the ring's circular part around the groove is opened, and the shut-off device can be removed.

This solution, therefore, constitutes an approach that removes the disadvantages of the prior art as described above. The shut-off device, that also incorporates the gas plug connector's visible part, needs to be installed only after completing other work in a room and can be mounted to have an aesthetic appearance as positional deviations of the stationary pipe installation may be compensated in this way. This means that pipe installation work can be done in a way customary to the trade without any additional effort needed. Also, replacing the gas plug connector's visible part becomes possible.

Further advantageous arrangements of the invention can be found in the other patent claims. It proved especially advantageous if the flank of the groove, situated inside the casing and that facing towards the shut-off device, is executed in such a way that the groove's width increases when seen from the groove's bottom as unintentional pulling out of the shut-off device is even better prevented by such layout.

In another advantageous arrangement, the catch groove's flank pointing away from the collar is executed so that the groove's width increases when seen from the groove's bottom. With such an arrangement in place, the holding ring can again slip out from the catch groove when the nozzle is longitudinally moved towards the casing, which means that the gas plug connector's position can be adjusted in direction of the nozzle's longitudinal axis. This is especially advantageous in case of concealed installations, as very often demanded due to an aesthetic appearance or when used in connection with so-called curtain walls, as otherwise even more work would be required as to the adjustment of the gas pipe's installation depth in relation the to the wall's outer surface, and the existing gas plug connectors are not fit for such purpose. In particular problems as they arise if precise dimensions are not yet available at the time of installation as it may be the case with tiling work will be removed by this approach.

Another arrangement results if the nozzle's surface has a conical tapering section located in the area behind the catch groove seen in the nozzle's longitudinal direction from the casing. The advantage in such arrangement is that also the nozzle's longitudinal axis can additionally swing which entails an even better adjustment option.

PRACTICAL EXAMPLES

The gas plug connector according to the present invention is described below in greater detail by means of a practical example in which an arrangement fit for concealed installation is used. The figures show the following:

FIG. 1 a gas plug connector in off position as sectional view

Figure 2:
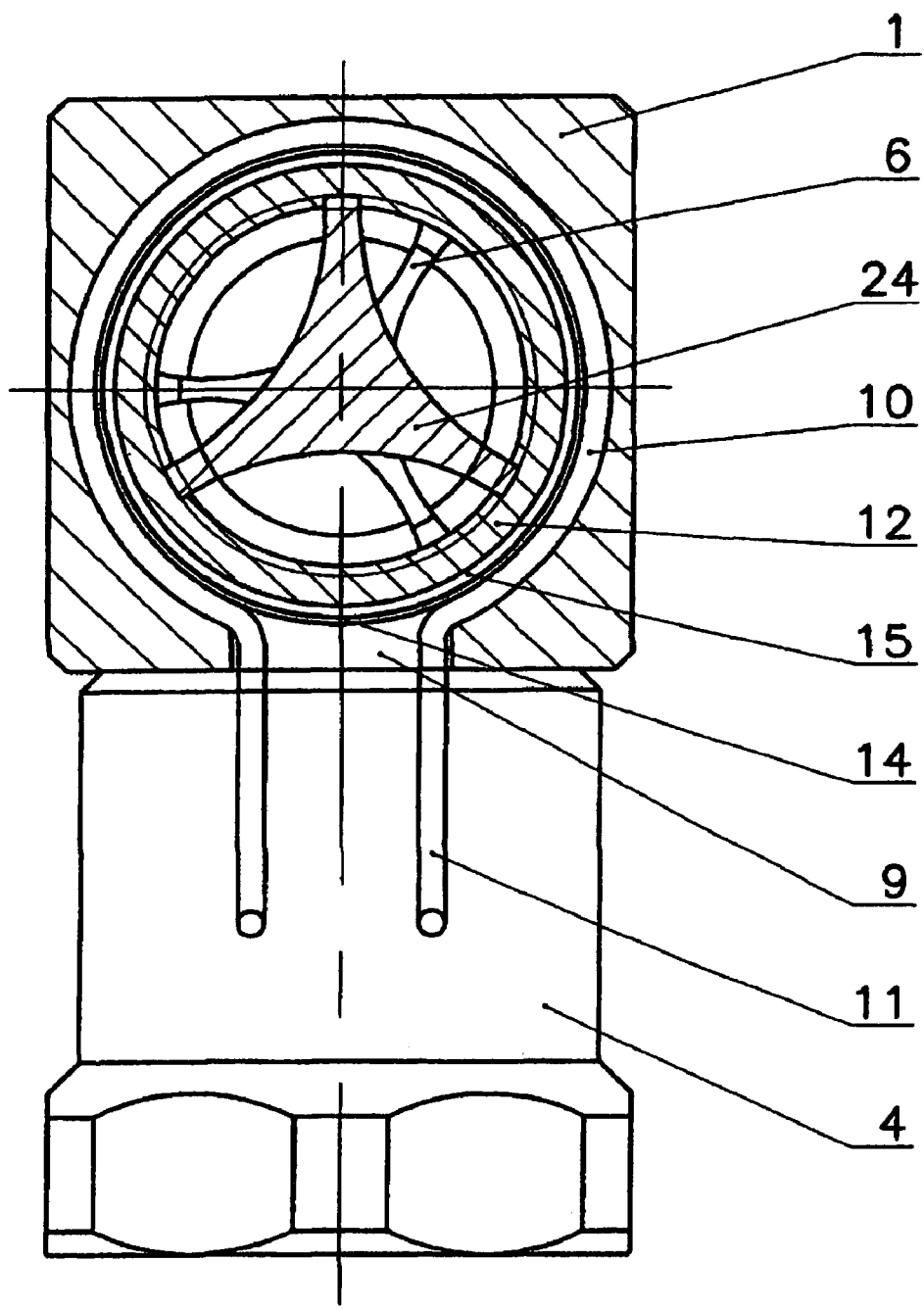

FIG. 2 an X—X sectional view of the gas plug connector as shown in FIG. 1

Figure 3:
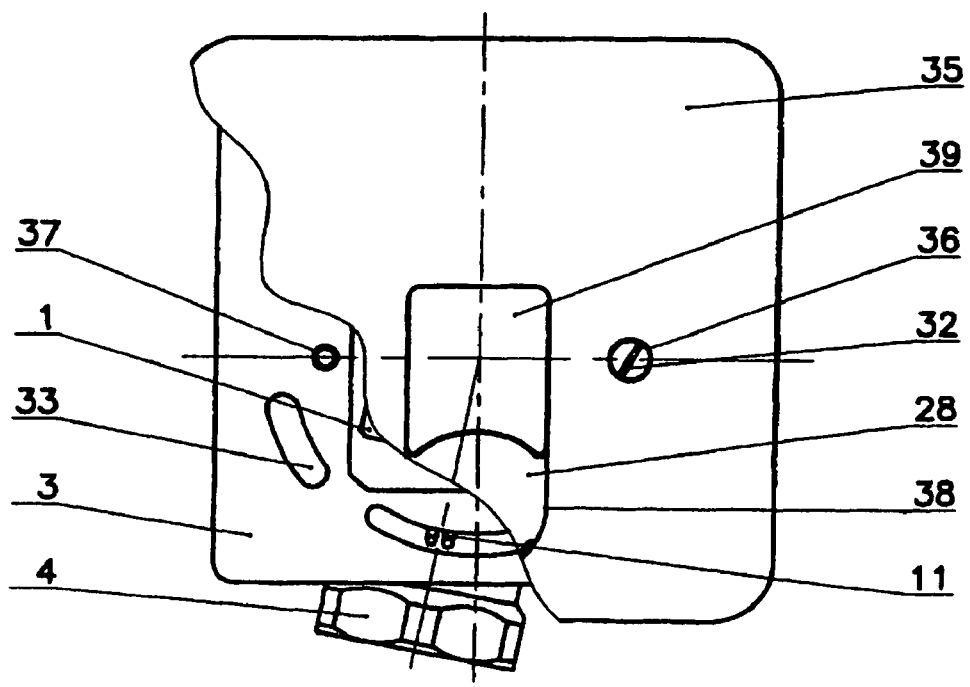
Figure 4:
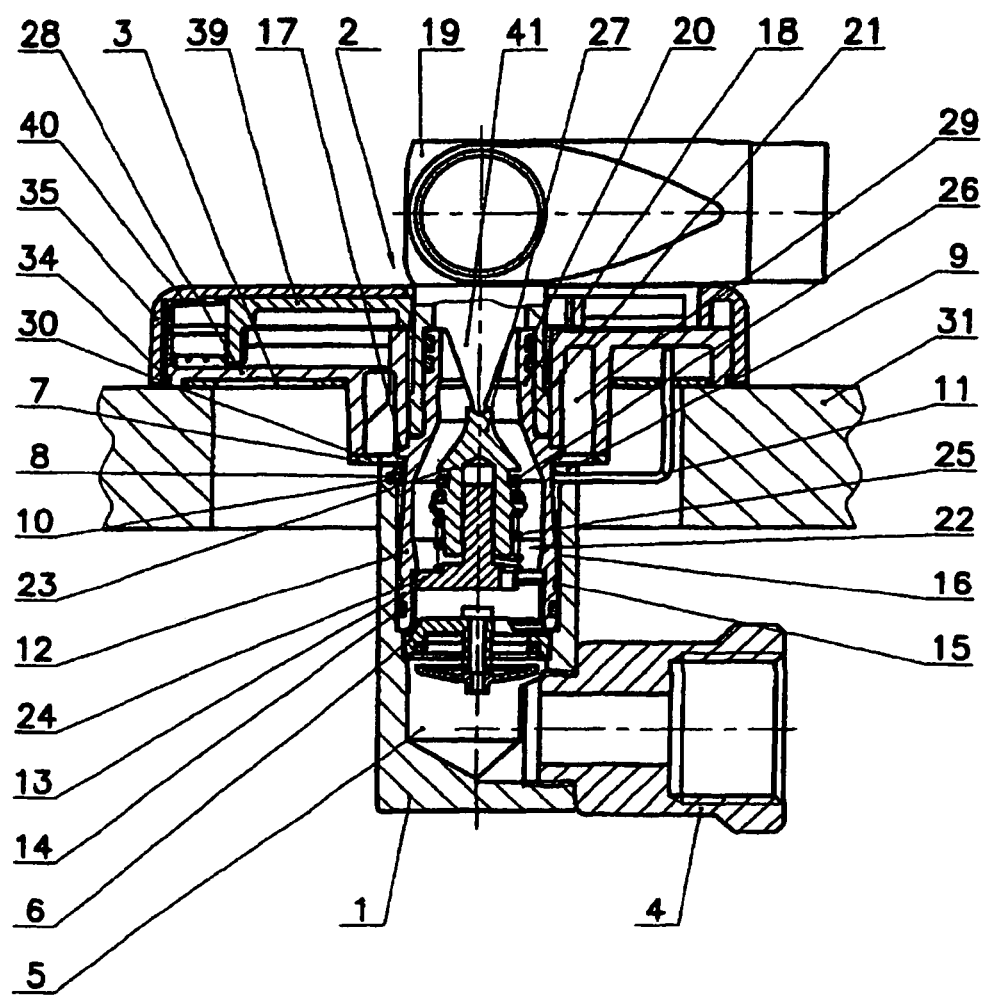
Figure 5:
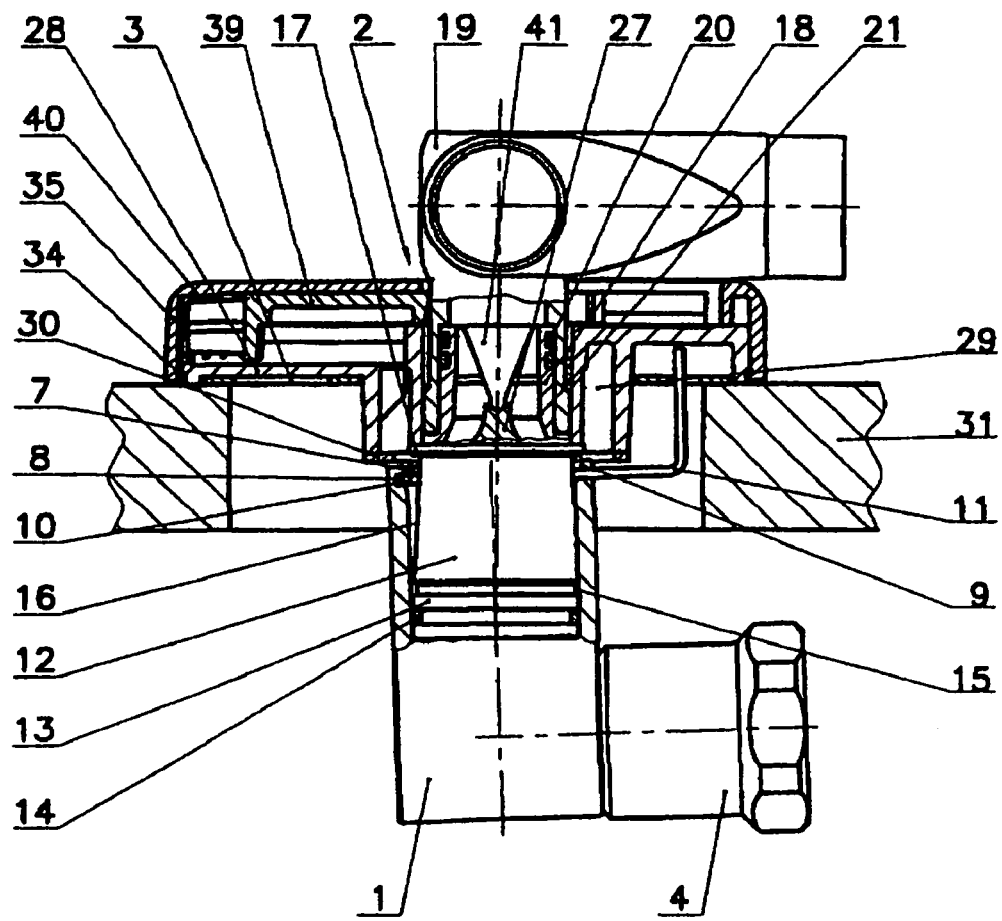

FIG. 3 an A view of the gas plug connector, as shown in FIG. 1, in partly cut-away state FIG. 4 a gas plug connector in on position as sectional view together with a gas connector plug FIG. 5 a part view of the gas plug connector, as shown in FIG. 4

In this arrangement example, the casing (1) has an integrated inlet socket (4) positioned at a right angle to the casing's (1) longitudinal axis, where the socket in this example is equipped with a female thread to allow a permanent connection between the gas plug connector and a stationary gas pipe (not shown). It is understood that the inlet socket (4), for example can be located at the casing's face side, or the connection can be made by a compression joint or the like. The gas entrance formed by the inlet socket (4) lead to a cylindrical space (5) into which a gas flow watchdog (6) is pressed behind the gas entrance.

In the immediate vicinity of a face-side opening (7) in the casing (1), the cylindrical space (5) has a groove (8) which is interrupted by a recess (9). The groove's (8) flank facing towards the opening (7) is designed so that the groove increases in its width, seen from the groove's bottom. Inside the groove (8), there is a circular spring holding ring (10) the internal diameter of which is selected so that it partly projects into the space (5). The holding ring's (10) ends (11) are bending outwards in radial direction and project through the recess (9). Outside the casing (1) said ends again bend, preferably at an right angle so that they are pointing parallel to the casing's longitudinal axis away from the same.

A nozzle (12) which belongs to the shut-off device (2) projects through the opening into the space (5) of the casing (1), with such nozzle having on its end inside the casing (1) a collar (13) with a circumferential groove in which rests an O-ring seal (14) that guarantees the required external gas-tightness.

The nozzle (12) and its interior contour form a valve seat (21) for an shut-off valve (22) the closing body (23) of which can freely move on a guide piece (24) along the nozzle's (12) axis, and in the direction of the valve seat (21). During its travel, the closing body (23) is loaded in closing direction under the force exercised by a closing spring (25), the one end of which rests on the guide piece (24), and the other one on the closing body (23). The O-ring seals (26), which are situated on the closing body and are resting on the valve seat (21) in off position, are to make the device gas-tight. The closing body's (23) axial extension (27) projects into the outlet socket (18).

A base plate (28), also belonging to the shut-off device (2), has a tube-shaped dome (29) that surrounds the outlet socket's (18) shell outer surface in a distance as required by the gas connector plug (19). At the dome's (29) face side, the shoulder (17) in form of a collar rests on the nozzle (12), with said shoulder being pressed against the dome (29) through a holding plate (30) that is screwed down to the dome (29).

The fasting element (3) in form of a metal sheet piece is arranged between a schematically shown wall (31), as used in many cases in particular in domestic buildings, and the base plate (28), to which the unit can be fixed to the wall (31) in a commonly accepted way by means of long holes (33) arranged in a circle, for example by using screws and dowels (not shown). (cf. FIG. 3)

Through catch elements (34), the base plate (28) is connected to a bonnet (35) which covers it up. The bonnet, as shown in FIG. 3 in a partly cut-away view, has two bore holes (36) on its front side to take up fastening screws (32) which are screwed down to the fastening element (3) by means of threaded holes (37) provided in the latter, and by means of a long hole (38), whereby the outlet socket's (18) gas exit is located behind some part of the long hole (38).

A slider (39) that serves as a cover is situated between bonnet (35) and base plate (28) where it is guided so that it can freely move along its longitudinal axis. A spring (40), the one end of which rests on the bonnet (35) and the other one on the slider (39), exercises forces in the slider's (39) moving direction, and by doing so causes the slider (39) to close the long hole's (38) area that makes the outlet socket's (18) gas exit accessible in such a way that only after an appropriate insertion move of the gas connector plug (19) the outlet socket's (18) gas exit can be made accessible, after which a connection between the gas connector and gas connector plug (19) will be enabled.

The way the gas plug connector works as shown in this practical example is described herein below:

FIG. 1 depicts a gas plug connector in pre-mounted position. The casing (1) is in, or behind the wall (31), and is connected through the inlet socket (4) with the stationary gas pipe, the position of which in this practical example, as can seen from FIG. 3, intentionally deviates from an rectangular arrangement as normally desired. By means of the long holes (38) provided in the fastening element (3) these deviations were corrected (as also can be seen from FIG. 3) so that the threaded holes (37) for fastening the shut-off device (2) are in the desired horizontal position. Now, the fastening element (3) can be secured in place to the wall (31) by means of the above mentioned screws (not shown).

In FIG. 1, the nozzle (12) of the shut-off device (2) is inserted into the casing (1) just as far as to allow the holding ring (10) to rest inside the catch groove (15). After doing so, the shut-off device (2) can be removed from the casing (1) only if the holding ring's (10) ends (11) are opened by means of a tool as wide as to allow the entire circular area is resting in the groove (8) inside the casing (1), as shown in FIG. 2 in contrast what is depicted in FIG. 1.

As can be seen from FIG. 4, the gas plug connector is now completely mounted. The nozzle (12) has been pushed further into longitudinal direction into the casing (1) until the base plate (28) rests at the fastening element (3), where at the beginning the holding ring (10) slips out of the catch groove (15) enabled by the slantwise arranged flank of the same. The shut-off device (2) can be permanently connected to the fastening element (3) by means of fastening screws (32).

When moving in insertion direction, positional set-offs in the nozzle's (12) longitudinal axis seen from the casing can be corrected, as shown in FIG. 5, by slightly tilting the nozzle (12) simultaneously so that the outer, visible parts of the gas plug connector are placed on the wall (31) in an aesthetic appearance.

Also, FIG. 4 shows a gas plug connector in on position, that is to say the gas connector plug's (19) connection piece in the uptake opening formed by the outlet socket's (18) shell outer surface and the dome's (29) shell inner surface. The required gas-tightness is guaranteed by O-ring seals (20) placed on the outlet socket's (18) shell outer surface. Only after external gas-tightness has been established a tappet (41) situated in the gas connector plug (19) pushes against the extension (27) and opens the shut-off valve (22) when further moving ahead the gas connector plug (19). Now, connection is made to the stationary gas pipe. The gas flow watchdog (6) located inside the casing (1) makes sure that in case of impermissible increases of the through flow, as it may happen for example with a broken gas hose, the gas pipe is shut-off by closing said gas flow watchdog (6).

In order to be able to reach behind the area of the wall (31) covered by the base plate (28) for renovation work to be carried out at a later time, just unscrew the fastening screws (32) and pull away from the wall (31) the shut-off device (2). This can be done until the holding ring (10) is locked in place inside the catch groove (15).

In case of a desired replacement of the shut-off device (2) the holding ring (10) must be opened, as described herein above, in order to completely pull out the shut-off device (2) together with the nozzle (12) from the casing (1). Should the stationary gas pipe connected to the inlet socket (4) not be closed at that time, it goes without saying the even in such a case the gas flow watchdog (6) would respond and close the line.

It goes without saying that the gas plug connector according to the invention is not restricted to the practical examples presented herein above. Changes, alterations and combinations are possible without leaving the invention's scope.

For instance, the inlet socket (4) can be placed so as to freely move inside the casing (1) in the same manner as shown in the connection between casing (1) and nozzle (12), where the casing (1), of course will be have also in this direction an area with a holding ring (10) resting in a groove (8) to take up the inlet socket's (4) part that can shift in this direction.

In order to achieve an even greater tilting area, as regards the nozzle's (12) longitudinal axis, the latter can be equipped with an additional conical section (16) that projects into the dome (29).

| List of Reference Numbers | |
|---|---|
| 1 | casing |
| 2 | shut-off device |
| 3 | fastening element |
| 4 | inlet socket |
| 5 | space |
| 6 | gas flow watchdog |
| 7 | opening |
| 8 | groove |
| 9 | recess |
| 10 | holding ring |
| 11 | end |
| 12 | nozzle |
| 13 | collar |
| 14 | O-ring seal |
| 15 | catch groove |
| 16 | section |
| 17 | shoulder |
| 18 | outlet socket |
| 19 | gas connector plug |
| 20 | O-ring seal |
| 21 | valve seat |
| 22 | shut-off valve |
| 23 | closing body |
| 24 | guide piece |
| 25 | closing spring |
| 26 | O-ring seal |
| 27 | extension |
| 28 | base plate |
| 29 | dome |
| 30 | holding plate |
| 31 | wall |
| 32 | fastening screw |
| 33 | long hole |
| 34 | catch elements |
| 35 | bonnet |
| 36 | bore hole |
| 37 | threaded hole |
| 38 | long hole |
| 39 | slider |
| 40 | spring |
| 41 | tappet |

The invention claimed is:

1. Gas plug connector with a casing (1) that has an inlet socket (4) to make a permanent connection between the gas plug connector to a stationary gas pipe installed on or in a wall (31), a shut-off device (2) for connection of a gas connector plug (19) thereto that releases an internal gas when external tightness has been established, whereby the shut-off device (2) has a tube-shaped nozzle (12) that has a collar (13) on an end facing towards the casing (1) and where said collar has a catch groove (15) bordering on a side pointing away from the casing (1), and the shut-off device (2) protrudes in a gas-tight way into an interior of the casing (1) which has a groove (8) in which rests a spring holding ring (10) that has ends (11) pointing sideward at an angle and projecting outwards through a recess (9) situated around the groove (8) inside the casing (1), and where a circular part of said ring (10) in opened state is entirely inside the groove (8) so that the nozzle (12) can slip into the casing (1), whereat the nozzle (12) with the holding ring (10) being inside the catch groove (15) is prevented from slipping out of the casing (1), and a fastening element (3) disposed between the casing (1) and the shut-off device (2) and that on one side is attached to the shut-off device (2) and on the other side to the wall (31), where the shut-off device (2) can swing around a longitudinal axis of the nozzle (12), seen from the casing (1), after the fastening element (3) is detached on one of the sides.

2. Gas plug connector according to claim 1, in which the flank of the groove (8), situated inside the casing (1), facing towards the shut-off device (2) is executed so that the groove's width increases, seen from the groove's bottom in upward direction.

3. Gas plug connector according to one of the claims 1 or 2, in which the flank of the catch groove (15) pointing away from the collar (13) is executed so that the groove's width increases, seen from the groove's bottom in upward direction.

4. Gas plug connector according to one of the claims 1 to 3, in which the nozzle's (12) surface has a conical tapering section (16) located in the area behind the catch groove (15) seen in the nozzle's longitudinal direction away from the casing (1).

5. Gas plug connector for connection of a gas connector plug (19) that releases an internal gas way when external tightness has been established therebetween, said gas plug connector comprising:
   a casing (1) for connecting to a stationary gas pipe installed on or in a wall (31) and defining an interior having a groove (8) inside said casing (1) and a recess (9) situated around said groove (8),
   a shut-off device (2) comprising a tube-shaped nozzle (12) protruding into said interior of said casing (1),
   said nozzle (12) defining a collar (13) facing towards said casing (1) and said collar (13) having a catch groove (15),
   a spring holding ring (10) disposed in said groove (8) and having ends (11) pointing sideward at an angle and projecting outwards through said recess (9) and having a circular part of said ring (10) entirely inside said groove (8) when in an opened state such that said nozzle (12) can slip into said casing (1) and said holding ring (10) engages said catch groove (15) of said nozzle (12) to prevent said nozzle (12) from slipping out of said casing (1),
   a fastening element (3) defining a long hole (33) for securing one side of said fastening element (3) to the wall (31) and a threaded hole (37) for securing the other side of said fastening element (3) to said shut-off device (2) such that said shut-off device (2) can rotate around a longitudinal axis of said nozzle (12) after said fastening element (3) is detached on one of said sides for aligning said shut-off device (2) in an aesthetically pleasing orientation.

6. Gas plug connector according to claim 5 wherein said groove (8) further defines a flank facing towards said shut-off device (2) that increases in width from a bottom of said groove (8) in an upward direction.

7. Gas plug connector according to claim 5 wherein said catch groove (15) further defines a flank pointing away from said collar (13) that increases in width from a bottom of said groove (15) in an upward direction.

8. Gas plug connector according to claim 5 wherein said nozzle (12) is further defined as having a conical tapering section (16) located behind said catch groove (15) in a longitudinal direction away from said casing (1).

* * * * *